J. HENDERSON.
WHEEL FOR ROAD VEHICLES.
APPLICATION FILED AUG. 17, 1907.
925,908.
Patented June 22, 1909.
2 SHEETS—SHEET 1.
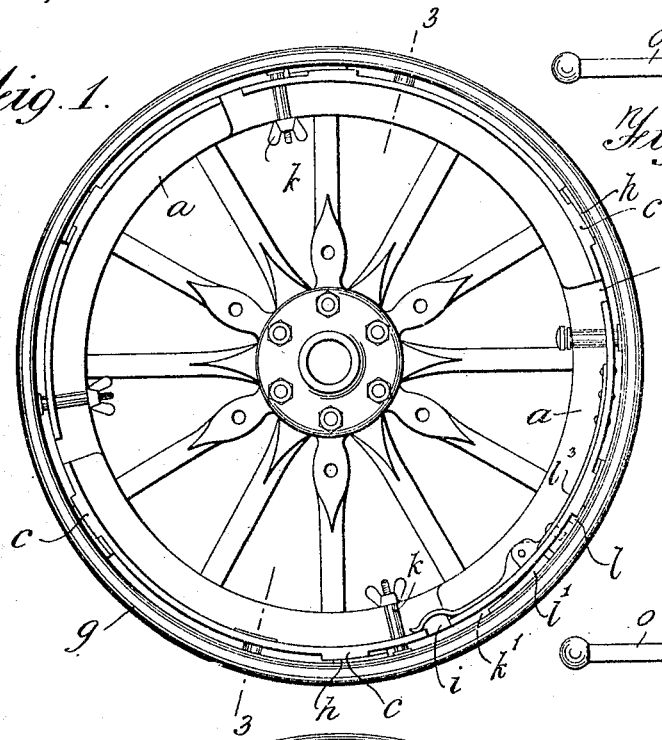
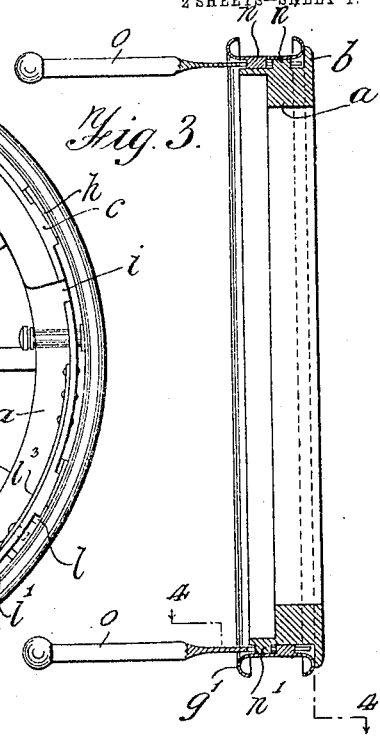
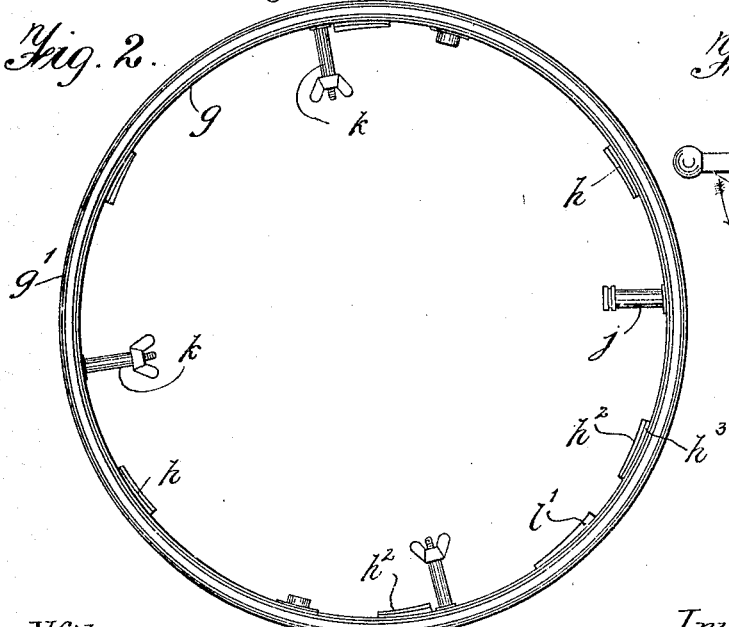
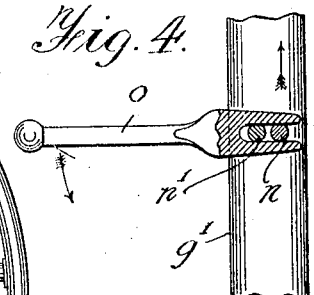
Witnesses:
Inventor
James Henderson
By his Attorney

J. HENDERSON.
WHEEL FOR ROAD VEHICLES.
APPLICATION FILED AUG. 17, 1907.

925,908.

Patented June 22, 1909.
2 SHEETS—SHEET 2.

Witnesses:
A. J. Haldan
A. S. Janes

Inventor
James Henderson
By his Attorney
R. Haldan

UNITED STATES PATENT OFFICE.

JAMES HENDERSON, OF BRUTON, ENGLAND.

WHEEL FOR ROAD-VEHICLES.

No. 925,908.　　　　　Specification of Letters Patent.　　　Patented June 22, 1909.

Application filed August 17, 1907. Serial No. 389,054.

*To all whom it may concern:*

Be it known that I, JAMES HENDERSON, a subject of the King of England, residing at Bruton, in the county of Somerset, England, temporarily residing at Lorain, in the State of Ohio, United States of America, have invented certain new and useful Improvements in Wheels for Road-Vehicles, of which the following is a specification.

This invention relates to improvements in wheels for road vehicles and the object is to provide a rim which may be easily and quickly dismounted from the wheel. Rims of this class are particularly adapted for use with the wheels of motor cars and the like for carrying a spare inflated pneumatic tire.

Figure 5:
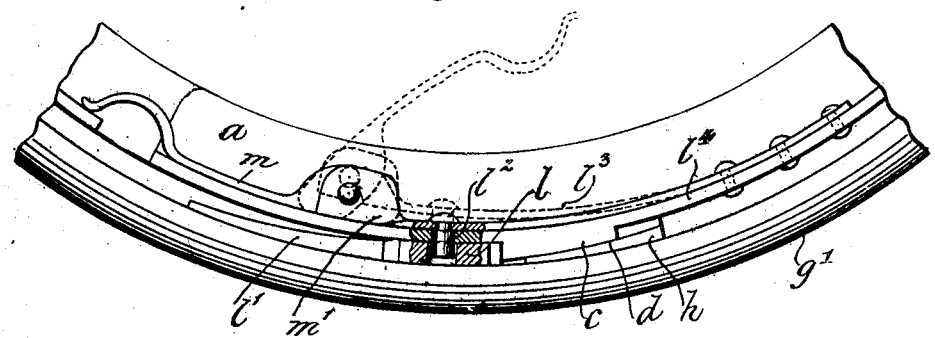
Figure 6:
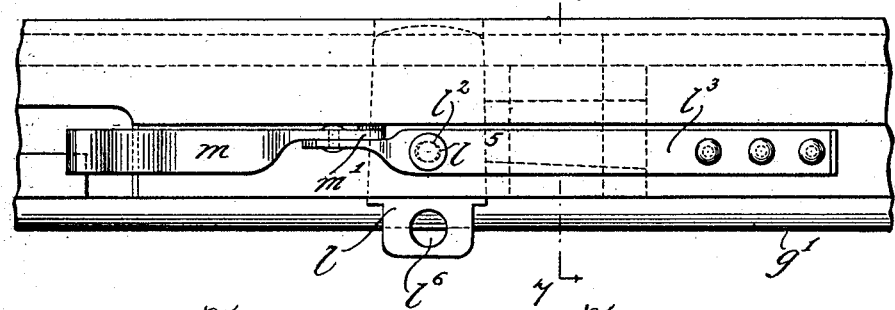
Figure 7:
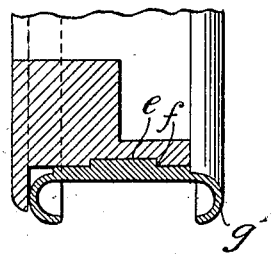
Figure 8:
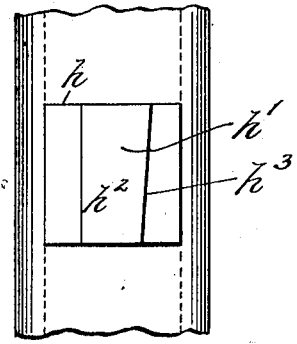

The invention comprises the novel features and combinations of parts hereinafter described and pointed out in the claims an embodiment of the invention being represented in the annexed drawings in which:

Figure 1 is a side elevation of the wheel with the detachable rim thereon. Fig. 2 is a side elevation of the rim detached from the wheel. Fig. 3 is a section on the line 3—3 of Fig. 1 showing also levers for shifting the rim relatively to the wheel and hereinafter referred to. Fig. 4 is a detail plan view of one of said levers in operative position in section on line 4—4 of Fig. 3. Fig. 5 is a detail view on an enlarged scale showing a fragment of the wheel felly and rim with a locking cotter and means for securing same. Fig. 6 is a plan view of Fig. 5. Fig. 7 is a section on line 7 7 of Fig. 6 and Fig. 8 is a detail plan view on an enlarged scale of one of the tapered projections on the rim hereinafter referred to.

The wheel felly $a$ is provided at one side with a circumferential flange $b$ and at intervals around its exterior periphery with projections $c$ having their exterior surfaces $d$ tapered or beveled in one direction. The said projections are each provided with a central recessed portion $e$ the base of which is similarly tapered and also one side of said recess as at $f$.

The detachable rim $g$ which has the usual curved edges $g^1$ for reception of the beaded or thickened edges of the tire is provided with a number of projections $h$ corresponding in number to the projections $c$ on the wheel felly. These projections have their interior surfaces tapered $h^1$ in a similar manner to the surfaces $d$ and are provided with central enlarged portions $h^2$ adapted to engage the recesses $e$ above referred to. One side $h^3$ of each of said enlarged portions is also tapered to co-act with the tapered side $f$.

The wheel felly $a$ is furnished at suitable points with angular slots $i$ for reception and passage of the tire valve and clamping bolts $j$ and $k$ respectively whereby the rim may be placed over the felly in a lateral direction and given a partial revolution thereon thus causing the enlarged portions $h^2$ of the projections $h$ to enter the recesses $e$ of the projections $c$ and the co-acting surfaces of said projections to engage each other. The co-acting tapered sides $f$ and $h^3$ referred to tend to force the rim firmly against the flange $b$ of the wheel felly and thus secure the rim firmly to said felly. The direction of taper given to the projections is preferably such that the wheel in revolving will tend to tighten the connection between the co-acting surfaces thereof.

For preventing accidental or unintentional detachment of the rim from the felly I provide a suitable number of locking cotters one of which is shown in the drawing. This cotter $l$ enters the space $k^1$ between the rim and felly and bears at one side against the lateral face of one of the projections $c$ on the felly and at the other side against an additional projection $l^1$ on the rim $g$.

To lock the cotter in position a pin $l^2$ is used mounted on the end of a spring $l^3$ secured to the inner surface of the flanged portion $l^4$ of the wheel and passing through a hole in said portion $l^4$ to engage a preferably slightly elongated hole $l^5$ in the cotter. The pin may be disengaged from the cotter when it is desired to remove the rim by providing a lever or handle $m$ pivoted to the free end of the spring and having an extension $m^1$ which when the lever is raised or moved toward the center of the wheel bears upon the flange $l^4$ and raises the spring thus removing the pin from the cotter to permit the same to be withdrawn or inserted. The cotter may have a hole $l^6$ at its end or ends for insertion of a suitable instrument for assistance in withdrawing it.

For the purpose of easily moving the rim relatively to the wheel when mounting or dismounting the rim I provide diametrically positioned pairs of studs $n$ $n^1$ adapted to be engaged by suitable forked implements $o$; one of each of said pairs of studs as $n^1$ is integral with the wheel felly and the other of each pair integral with the rim but the positions of these studs are reversed at diametric points that is to say the stud is on the outside of the wheel and on the inside of the rim at one point and on the inside of the wheel and on the outside of the rim at the opposite point. On inserting the forked portion of the implements *o* between the rim and felly to embrace the pairs of studs and exerting pull in the same direction on said implements, one stud of each pair will act as a fulcrum for the implement and the rim will be moved relatively to the felly in the direction desired as will be readily understood.

I do not limit myself to the arrangements of parts and details of construction shown and described as the same may be varied without departing from the spirit of the invention.

What I claim as my invention and desire to secure by Letters Patent of the United States is:—

1. The combination with a wheel felly, of a plurality of exterior peripheral tapered projections on said felly having recessed portions therein a detachable rim and a plurality of interior peripheral tapered projections on said rim having enlarged portions adapted to engage the aforesaid recessed portions of the projections on the wheel felly for the purpose set forth.

2. The combination with a wheel felly, of a lateral flange thereon, a plurality of exterior peripheral tapered projections on said felly, having recessed portions therein, a detachable rim, and a plurality of interior peripheral tapered projections on said rim having enlarged portions adapted to engage the aforesaid recessed portions of the felly projections, co-acting lateral surfaces of said recessed and enlarged portions being also tapered for the purpose set forth.

3. The combination with a wheel felly, of a lateral flange thereon, a plurality of exterior peripheral tapered projections on said felly, having recessed portions therein, a detachable rim, a plurality of interior peripheral tapered projections on said rim having enlarged portions adapted to engage the aforesaid recessed portions of the felly projections, co-acting lateral surfaces of said recessed and enlarged portions being also tapered, means for displacing the rim axially with regard to the felly, a cotter for preventing relative movement of said rim and felly and means for locking and releasing said cotter.

In witness whereof I have signed this specification in the presence of two witnesses.

JAMES HENDERSON.

Witnesses:
   JAS. T. HURSLEY,
   DANIEL A. COOK.